(12) United States Patent
Agarwal et al.

(10) Patent No.: US 12,040,946 B2
(45) Date of Patent: Jul. 16, 2024

(54) DECOMPOSITION AND DISTRIBUTION OF NETWORK FUNCTIONS FOR DEPLOYMENT FLEXIBILITY

(71) Applicant: Parallel Wireless, Inc., Nashua, NH (US)

(72) Inventors: Kaitki Agarwal, Westford, MA (US); Fernando Cerioni, Lancaster, MA (US)

(73) Assignee: Parallel Wireless, Inc., Nashua, NH (US)

(*) Notice: Subject to any disclaimer, the term of this patent is extended or adjusted under 35 U.S.C. 154(b) by 0 days.

(21) Appl. No.: 17/094,806

(22) Filed: Nov. 10, 2020

(65) Prior Publication Data

US 2021/0144061 A1   May 13, 2021

Related U.S. Application Data

(60) Provisional application No. 62/933,519, filed on Nov. 10, 2019.

(51) Int. Cl.
*H04L 41/0896* (2022.01)
*H04L 41/0806* (2022.01)
*H04W 24/02* (2009.01)

(52) U.S. Cl.
CPC ...... *H04L 41/0896* (2013.01); *H04L 41/0806* (2013.01); *H04W 24/02* (2013.01)

(58) Field of Classification Search
CPC ............ H04L 41/0896; H04L 41/0806; H04L 41/5054; H04W 24/02
See application file for complete search history.

(56) References Cited

U.S. PATENT DOCUMENTS

| | | | |
|---|---|---|---|
| 2012/0124229 A1 | 5/2012 | Sahu et al. | |
| 2017/0054595 A1 | 2/2017 | Zhang et al. | |
| 2018/0213441 A1* | 7/2018 | Mehta | H04W 28/085 |
| 2019/0268270 A1* | 8/2019 | Fattah | H04L 43/026 |
| 2020/0029199 A1* | 1/2020 | Sen | H04L 41/0895 |
| 2020/0183722 A1* | 6/2020 | Kumar | G06F 9/45558 |
| 2020/0287977 A1* | 9/2020 | Cui | H04L 67/51 |
| 2021/0073020 A1* | 3/2021 | Zhu | G06F 9/5077 |
| 2023/0205752 A1 | 6/2023 | Singhal | |

OTHER PUBLICATIONS

Mavrakis: "The Evolution of Network Slicing", www.abiresearch.com, published Nov. 2, 2017.

* cited by examiner

*Primary Examiner* — Charles C Jiang
*Assistant Examiner* — Shawn D Miller
(74) *Attorney, Agent, or Firm* — Michael Y. Saji; David W. Rouille

(57) ABSTRACT

Methods and computer software are disclosed for providing decomposition and distribution of network functions. In one example embodiment a method includes decomposing a node in a network into a decomposed node including a plurality of virtual machines or containers; and moving the decomposed node to any location across the network.

16 Claims, 11 Drawing Sheets

DECOMPOSITION AND DISTRIBUTION OF NETWORK FUNCTIONS FOR DEPLOYMENT FLEXIBILITY

CROSS-REFERENCE TO RELATED APPLICATIONS

This application claims priority under 35 U.S.C. § 119(e) to U.S. Provisional Pat. App. No. 62/933,519, filed Nov. 10, 2019, titled "Decomposition and Distribution of Network Functions for Deployment Flexibility" and hereby incorporated by reference in its entirety for all purposes. This application hereby incorporates by reference, for all purposes, each of the following U.S. patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017. This document also hereby incorporates by reference U.S. Pat. Nos. 9,107,092, 8,867, 418, and 9,232,547 in their entirety. This document also hereby incorporates by reference U.S. patent application Ser. No. 14/822,839, U.S. patent application Ser. No. 15/828, 427, U.S. Pat. App. Pub. Nos. US20170273134A1, US20170127409A1 in their entirety. Features and characteristics of and pertaining to the systems and methods described in the present disclosure, including details of the multi-RAT nodes and the gateway described herein, are provided in the documents incorporated by reference.

BACKGROUND

It is possible to consider the telecommunications network as broadly containing: an edge, where the base station is located; a middle, which is the portion of the network between the edge and the core; and the core itself, which is located at a centralized location. Cellular networks may typically have between one and ten core networks for handling up to hundreds of millions of subscribers. The bulk of the functionality of the core network exists only at the core.

SUMMARY

Methods and systems for providing decomposition and distribution of network functions are disclosed. In one embodiment a method includes decomposing a node in a network into a decomposed node including a plurality of virtual machines or containers; and moving the decomposed node to any location across the network. A decomposed node may be moved by terminating its processes, or by saving the state and reactivating the processes with its saved state. Active-standby may be used to ensure that reactivation is smooth.

In another embodiment, a non-transitory computer-readable medium containing instructions for providing decomposition and distribution of network functions is described. which, when executed, cause a system to perform steps comprising: decomposing a node in a network into a decomposed node including a plurality of virtual machines or containers; and moving the decomposed node to any location across the network. Decomposition may be based on function; location; active connections or sessions at various layers in the network; on usage; or on ability to reconstitute.

DETAILED DESCRIPTION

Figure 1:
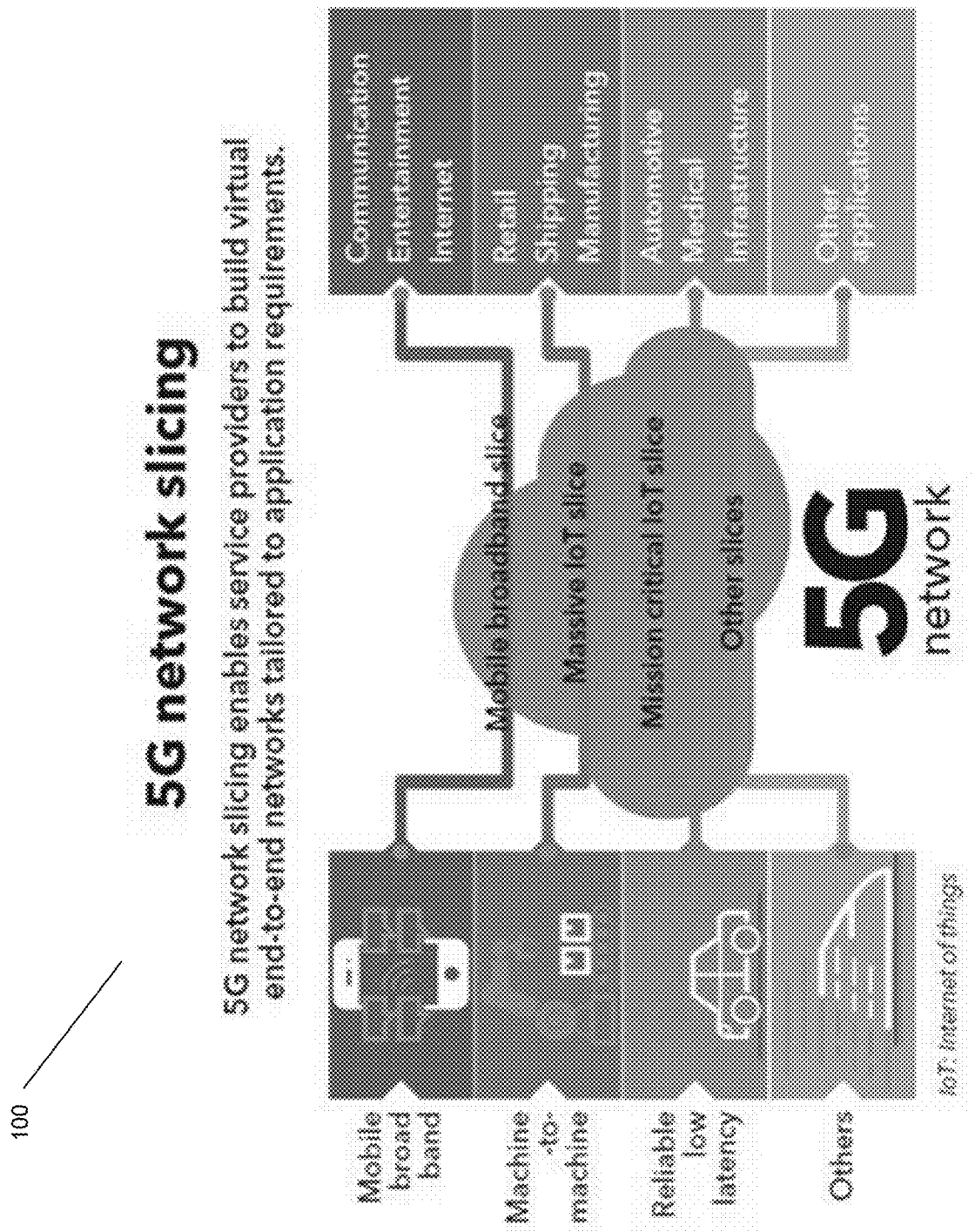
FIG. 1 is a diagram showing 5G network slicing, in accordance with some embodiments.

It is possible to consider the telecommunications network as broadly containing: an edge, where the base station is located; a middle, which is the portion of the network between the edge and the core; and the core itself, which is located at a centralized location. Cellular networks may typically have between one and ten core networks for handling up to hundreds of millions of subscribers. The bulk of the functionality of the core network exists only at the core. Moving these functions closer to the cell edge is desirable as it reduces latency, in particular in order to enable low latency performance demanded by 5G.

Certain embodiments of the presently described decomposition and distribution of network functions for deployment flexibility are described using a decomposable network orchestrator, the Parallel Wireless HetNet Gateway. 5G both forces and enables decomposability, as it requires certain features such as control plane and user plane separation that result in a need for more network functions; by using decomposable network functions, the inventors have appreciated that the network functions can not only be provided in a scalable and redundant fashion but can be multiply deployed in more places.

Importantly, any node can be decomposed and moved anywhere across the network, including at the cell site, aggregation site, edge site, data center site, back office site. A single network function can also be decomposed across multiple sites. Any function can be allocated anywhere in the network, where "anywhere in the network" means as close to the Edge (i.e.: tower) as needed. Example: low latency applications (Augmented Reality, V2X applications, Real-Time/Near-Real-Time apps) will be located at the Edge; the inventors have identified this as an "edge Core" or "EdgeCore," and have understood that it is possible, using VNFs and the other methods described herein, to enable core processing to take place not only at the edge, but anywhere throughout the network from edge to core to the "middle" of the network as well, and for processing to be distributed dynamically based on need.

In some embodiments, the cell edge can be further understood to contain: the cell site itself, where the radio will be located; an aggregation site; and/or an edge site, depending on the decisions made by the network operator.

In some embodiments, a single HetNet Gateway can be decomposed into a plurality of virtual machines or containers. These can be orchestrated using a virtual machine or container orchestration scheme. A routing table can be stored internally to provide internal networking among the virtual machines. This routing table can be kept consistent even as the virtual machines or containers are migrated across multiple physical machines and across networks. Interfaces may be provided between the decomposed network functions. In some embodiments, standard interfaces may be used, such as when decomposing network functions along existing protocol lines (S1 when decomposing MME functionality for a subset of users, for example). In other embodiments, proprietary or custom interfaces may be used. In other embodiments, interfaces that correspond to internal memory sharing or state sharing interfaces can be used. For example, a logical bus/shared memory/queue/database can be modeled using an interface to provide decomposability for any network function that is internally dependent on such a logical bus/shared memory/queue/database, etc. data store. In some embodiments, virtual networking can be provided among the network functions to enable a basic level of interoperability.

The present disclosure also provides decomposability and deployment flexibility for features and network functions that are not traditionally understood to be flexible, for example, the baseband processing unit can be decomposed using the same technologies described herein and can be spread out or moved around throughout the network.

The present disclosure also applies to network slicing. Network slicing as understood in the art is the identification of network resources from end to end throughout the network as belonging to a particular user or user session, e.g., enabling a single user to have a group of network resources (from the eNodeB to the MME to the PGW and beyond) allocated to that user; this is useful when the user's network usage is possible to be characterized as, e.g., low-bandwidth, high-bandwidth, emergency services, machine-to-machine (M2M), interactive or non-interactive, voice or video, etc. When resources can be deployed anywhere, including to the edge of the network, such resources can be enabled for network slicing, such that each resource is able to be sliced and enabled to designate portions of resources as belonging to a network slice. The virtualization techniques described herein can also be used to virtualize an individual slice at any layer of the network, e.g., a new container can be created to provide a dedicated network function for a particular network slice at a particular deployment location. Vertical network slicing is network slicing that enables particular verticals, which for 5G may include: IoT; public safety; connected vehicles; power infrastructure. Horizontal network slicing is further network slicing beyond vertical that can discriminate on a per user or per consumer level. Since deployment flexibility using the methods described herein provide greater flexibility than traditional network slicing, it enables horizontal network slicing, including at every node in the network.

It is understood that the present disclosure includes deployment according to: different virtualization methods (for example, virtual machines, containers, orchestration schemes, hypervisors) or virtualization layers/levels; a hybrid combination of VMs and containers; VMware and KVM hypervisors; independently scalable control plane and user plane (data plane); Nomad and Kubernetes container scheduler; automatic scale-in, scale out; microservices-based architecture; private cloud, public cloud, on-prem and off-prem cloud; deployment of various network functions other than those mentioned hereinabove, including network functions commonly understood as necessary for 2G/3G/4G/5G/Wi-Fi/VoIP/satellite/standard IP communications; network functions that are common to more than one radio access technology, such as an AAA or billing server.

The protocols described herein have largely been adopted by the 3GPP as a standard for the upcoming 5G network technology as well, in particular for interfacing with 4G/LTE technology. For example, X2 is used in both 4G and 5G and is also complemented by 5G-specific standard protocols called Xn. Additionally, the 5G standard includes two phases, non-standalone (which will coexist with 4G devices and networks) and standalone, and also includes specifications for dual connectivity of UEs to both LTE and NR ("New Radio") 5G radio access networks. The inter-base station protocol between an LTE eNB and a 5G gNB is called Xx. The specifications of the Xn and Xx protocol are understood to be known to those of skill in the art and are hereby incorporated by reference dated as of the priority date of this application.

In some embodiments, several nodes in the 4G/LTE Evolved Packet Core (EPC), including mobility management entity (MME), MME/serving gateway (S-GW), and MME/S-GW are located in a core network. Where shown in the present disclosure it is understood that an MME/S-GW is representing any combination of nodes in a core network, of whatever generation technology, as appropriate. The present disclosure contemplates a gateway node, variously described as a gateway, HetNet Gateway, multi-RAT gateway, LTE Access Controller, radio access network controller, aggregating gateway, cloud coordination server, coordinating gateway, or coordination cloud, in a gateway role and position between one or more core networks (including multiple operator core networks and core networks of heterogeneous RATs) and the radio access network (RAN). This gateway node may also provide a gateway role for the X2 protocol or other protocols among a series of base stations. The gateway node may also be a security gateway, for example, a TWAG or ePDG. The RAN shown is for use at least with an evolved universal mobile telecommunications system terrestrial radio access network (E-UTRAN) for 4G/LTE, and for 5G, and with any other combination of RATs, and is shown with multiple included base stations, which may be eNBs or may include regular eNBs, femto cells, small cells, virtual cells, virtualized cells (i.e., real cells behind a virtualization gateway), or other cellular base stations, including 3G base stations and 5G base stations (gNBs), or base stations that provide multi-RAT access in a single device, depending on context.

In the present disclosure, the words "eNB," "eNodeB," and "gNodeB" are used to refer to a cellular base station. However, one of skill in the art would appreciate that it would be possible to provide the same functionality and services to other types of base stations, as well as any equivalents, such as Home eNodeBs. In some cases Wi-Fi may be provided as a RAT, either on its own or as a component of a cellular access network via a trusted wireless access gateway (TWAG), evolved packet data network gateway (ePDG) or other gateway, which may be the same as the coordinating gateway described hereinabove.

The word "X2" herein may be understood to include X2 or also Xn or Xx, as appropriate. The gateway described herein is understood to be able to be used as a proxy, gateway, B2BUA, interworking node, interoperability node, etc. as described herein for and between X2, Xn, and/or Xx, as appropriate, as well as for any other protocol and/or any other communications between an LTE eNB, a 5G gNB (either NR, standalone or non-standalone). The gateway described herein is understood to be suitable for providing a stateful proxy that models capabilities of dual connectivity-capable handsets for when such handsets are connected to any combination of eNBs and gNBs. The gateway described herein may perform stateful interworking for master cell group (MCG), secondary cell group (SCG), other dual-connectivity scenarios, or single-connectivity scenarios.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to 5G networks, LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention.

FIG. 1 shows a diagram of 5G network slicing 100. Network slicing has multiple use cases servicing different needs, taking into account latency, reliability, throughput, density, speed and flexibility. These use cases include, but are not limited to, autonomous vehicles, smart traffic management, emergency networks, factory automation, high speed rail, short lived massive outdoor events, Internet of Things (IoT), any media anywhere, remote medical, smart city/grids, virtual reality and fixed wireless access.

Figure 2:
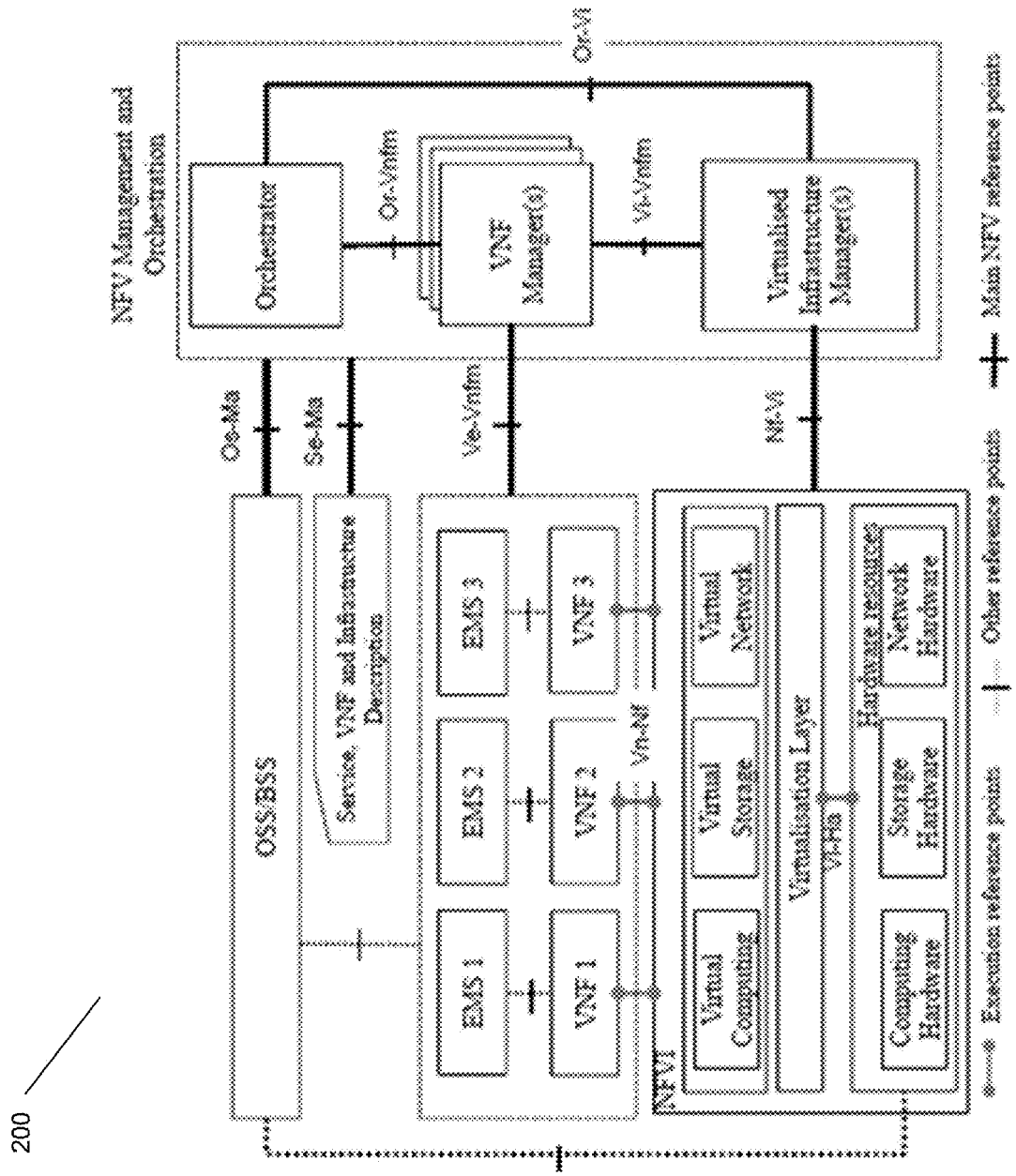
FIG. 2 is a diagram showing a Virtual Network Function (VNF) architecture.
Figure 3:
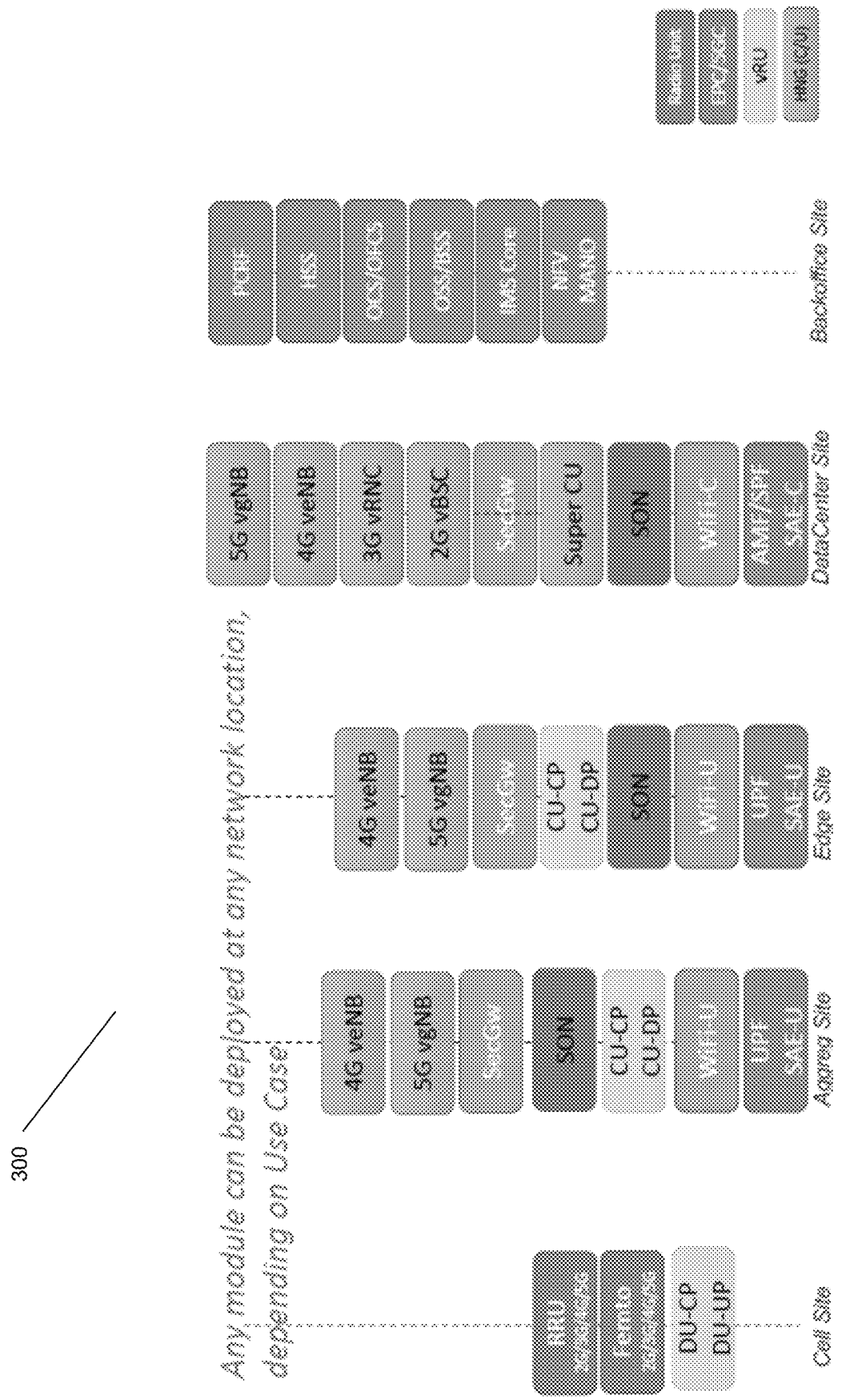
FIG. 3 is a diagram showing a fully decomposed and virtualized architecture, in accordance with some embodiments.

FIG. 2 is a diagram showing an example Virtual Network Function (VNF) architecture 200. A NFV management and orchestration layer sits next to a network function virtualization (NFV) infrastructure. This management and orchestration layer (MOL) orchestrates the creation/management/distribution/deallocation of VNFs at VNF manager(s), and creation/management/distribution/deallocation of virtualized infrastructure (hardware resources) as well, so that VNFs as well as resources can be dynamically allocated and deallocated, as well as distributed. Third party VNFs can be hosted and on same network function virtualization (NFV) infrastructure. Hypervisor based virtualization: KVM, VMWare, OpenStack and Linux Container evolution are hosted at the virtualization layer. The virtualized Infrastructure manager(s) include VMWare vCenter, vcloud, and OpenStack. Hardware resources include COTS Intel x86 HW agnostic (no proprietary), High performance technology support (e.g. SRIOV, WindRiver/6Wind OVS, Contrail, etc. Interfaces are shown between the various FIG. 3 is a diagram showing a fully decomposed and virtualized architecture 300, in accordance with some embodiments. As shown, any module can be deployed at any network location, depending on use case. The network locations are each configured according to the NFV infrastructure shown in FIG. 2, and the management and orchestration layer is able to see the VNF modules throughout the infrastructure, and allocate, deallocate, and distribute them throughout the VNF infrastructure. The MOL architecture can take into account VNF requirements, for instance, the need for a certain amount of fronthaul bandwidth for a CU-UP or DU-UP function located away from the cell site, and can ensure that distribution of a VNF meets all requirements. These requirements can be assessed at anything from a best-effort level to a required level. The requirements can be based on bandwidth, compute, or other usage requirements for a current state or a projected state, including an estimated state or a manually configured state based on an expected number of clients or users.

Certain VNFs may exist in more than one location. For example, with SON, which is shown at both the aggregation site and edge site and datacenter site, the available inputs to the SON may differ based on the location, and therefore multiple distinct SON VNFs may exist and may or may not coordinate to provide SON functionality. As another example, 4G veNB functionality is shown at aggregation site and edge site and datacenter site. 4G vENB functionality can be present at any of these sites and can be distributed back and forth among these sites. For example, a veNB VNF may be powered down at an aggregation site due to nighttime inactivity, and moved to (state "frozen" and "thawed" at) the edge site or datacenter site. Once the daytime traffic spike begins, the VNF may be moved back out to the edge for greater performance, or, multiple instances can be spun up at the datacenter site utilizing the greater hardware availability at that site. By changing the deployment situation of this VNF, the operator can realize significant electricity savings.

Figure 4:
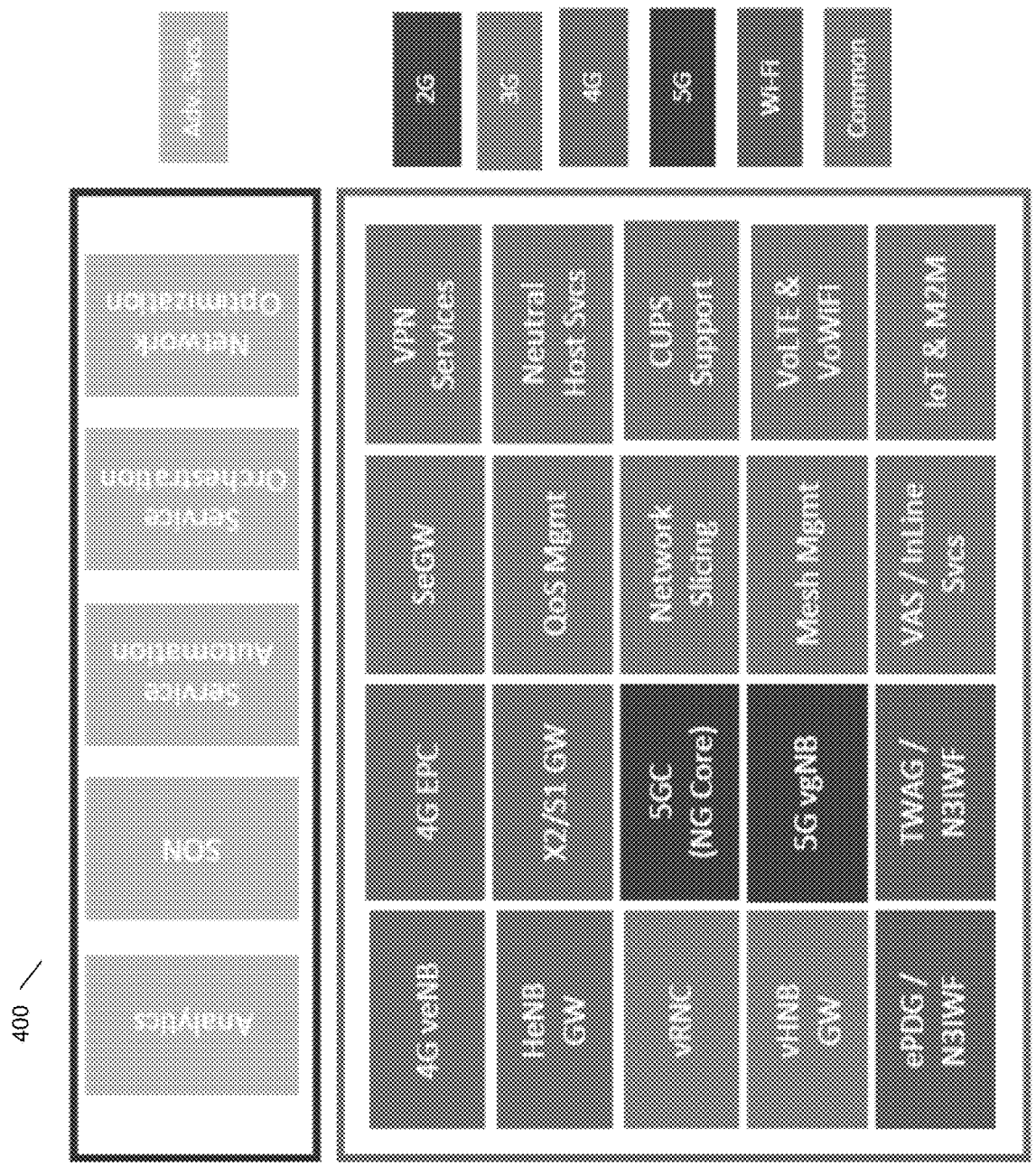
FIG. 4 is a diagram showing an HNG platform having a suite of RAN and mobile core functions, in accordance with some embodiments.

FIG. 4 is a diagram showing an HNG platform 400 having a suite of RAN and mobile core functions, in accordance with some embodiments. This may include Standards-compliant OpenRAN Controller; fully virtualized architecture, maximum deployment flexibility; a suite of virtualized functions, can be deployed anywhere in the network: Tower, Aggregation Site, Cell Edge, Data Center; functions can be deployed combined or individually; web-scale architecture, allows Vertical and Horizontal scalability; new virtualized functions can be added as technology & standards evolve; Simplified Management via PW OAM Platform & Service Orchestration and may be based on highly available architecture (Five Nines). Each and any of these functions may be sliced off into a VNF and may be distributed. Using appropriate coordination, each and any of these VNFs may operate to coordinate activity on a given number of users, a given geographic or network area, etc., and using coordination, the assignment of VNFs to a given group of users or areas may be reallocated and redistributed at any time. Regarding advanced services (e.g., as shown, analytics, SON, service automation, service orchestration, network optimization), these services may be enabled to access any data in any of the managed VNFs wherever located.

Figure 5:
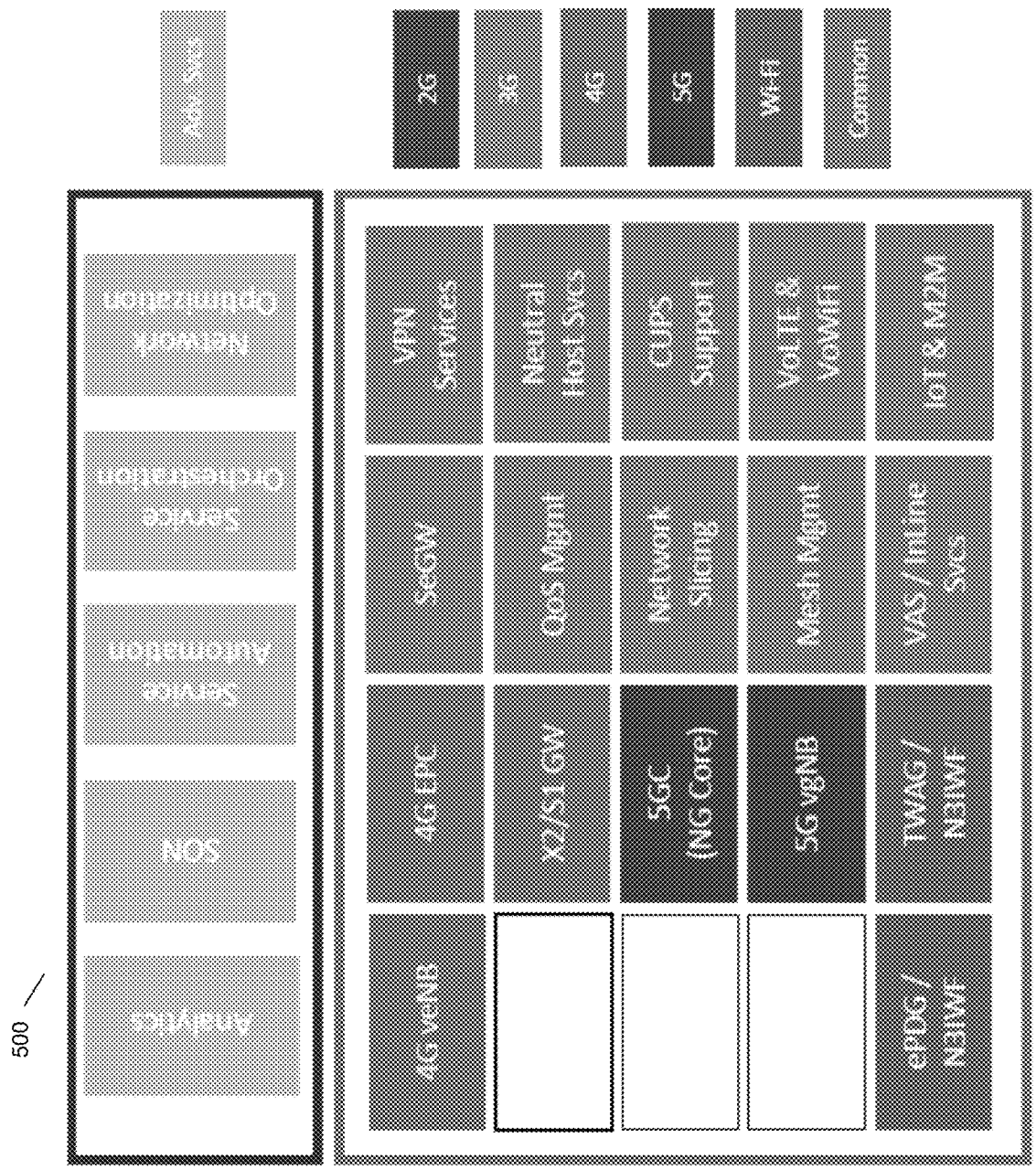
FIG. 5 is a diagram showing an HNG platform having a suite of RAN and mobile core functions for 4G/5G use case, in accordance with some embodiments.

FIG. 5 is a diagram showing an HNG platform having a suite of RAN and mobile core functions for the specific 4G/5G ORAN controller use case 500, in accordance with some embodiments. This may include standards-compliant XRAN Controller; virtualized eNB and gNB for Macro Cells; HeNB Gateway for SmallCells; X2/S1 Gateway for interop w/existing Macro network; Security Gateway; QoS Management; CUPS support; Optional 4G EPC integrated into solution; Optional VAS/TDF/InLine Services; and Optional integration with Fixed/WiFi/Unlicensed Access.

Figure 6:
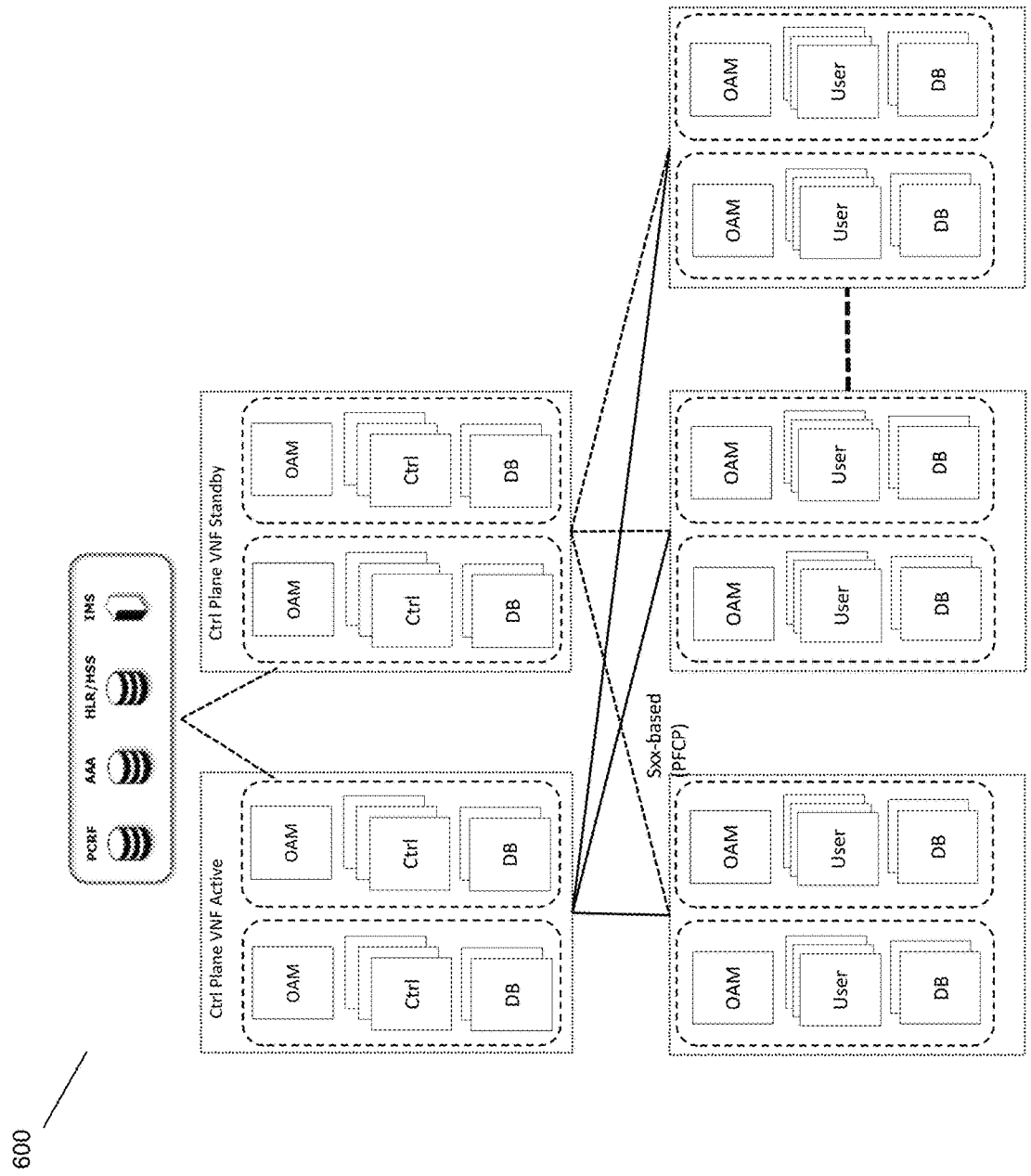
FIG. 6 is a diagram showing a distributed HNG deployment, in accordance with some embodiments.

FIG. 6 is a diagram showing a distributed HNG deployment 600, in accordance with some embodiments. This may include Distributed Ctrl & User Planes geographically distributed; CP to UP 1:N ratio (i.e.: could be 1:50 or 1:200+). At each location, the HNG VNF is composed of the Ctrl Plane "sub-VNF" and the User Plane "sub-VNF", behaving as a single logical entity (i.e.: single HNG). All components here behave as a single, geo-distributed, redundant HNG. Local Redundancy (Layer2) in same location supported— OAM: 1+1/CP: M+N/UP: M+N. Local: each group of VMs (OAM/Ctrl/User/DB) allocated in separate failure domain/ server. No need for Active/Standby redundancy on User Plane. Horizontal scalability—Each VM type scales independently per Use Case: 2G, Voice, IoT: CP intensive; 4G, 5G, Video, eMBB: UP intensive. User Plane located close to the user for reduced latency and MEC-compliant deployments. Suitable for 2G/3G/4G with CUPS/5G/Femto/WiFi/EPC services. Good for large/very large size deployments with CP-UP separation and multiple UE anchor point and/or multiple Local Breakout locations.

Figure 7:
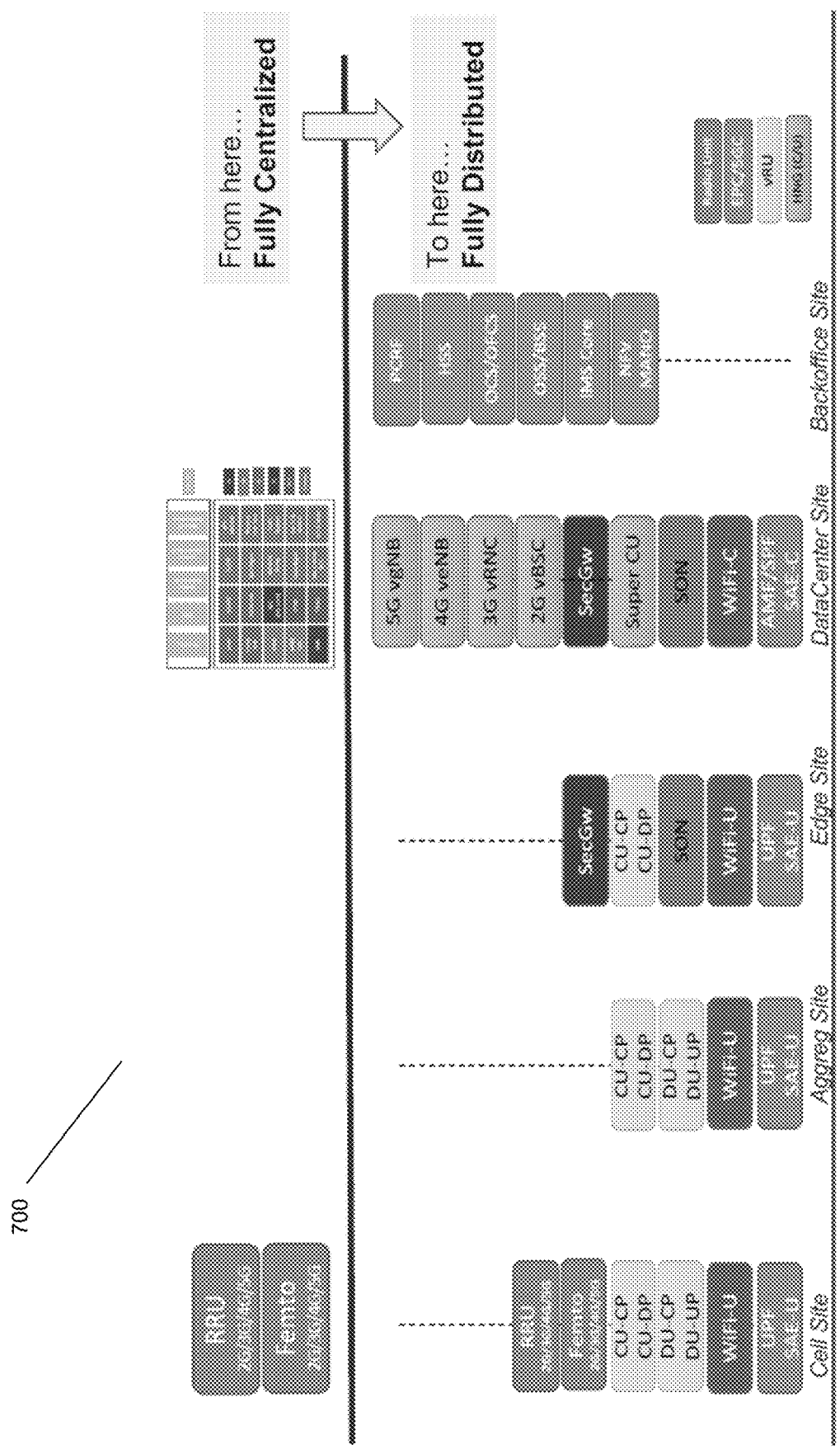
FIG. 7 is a diagram showing a software based fully distributed mobile solution, in accordance with some embodiments.

FIG. 7 is a diagram showing a software based fully distributed mobile solution, 700 in accordance with some embodiments.

Figure 8:
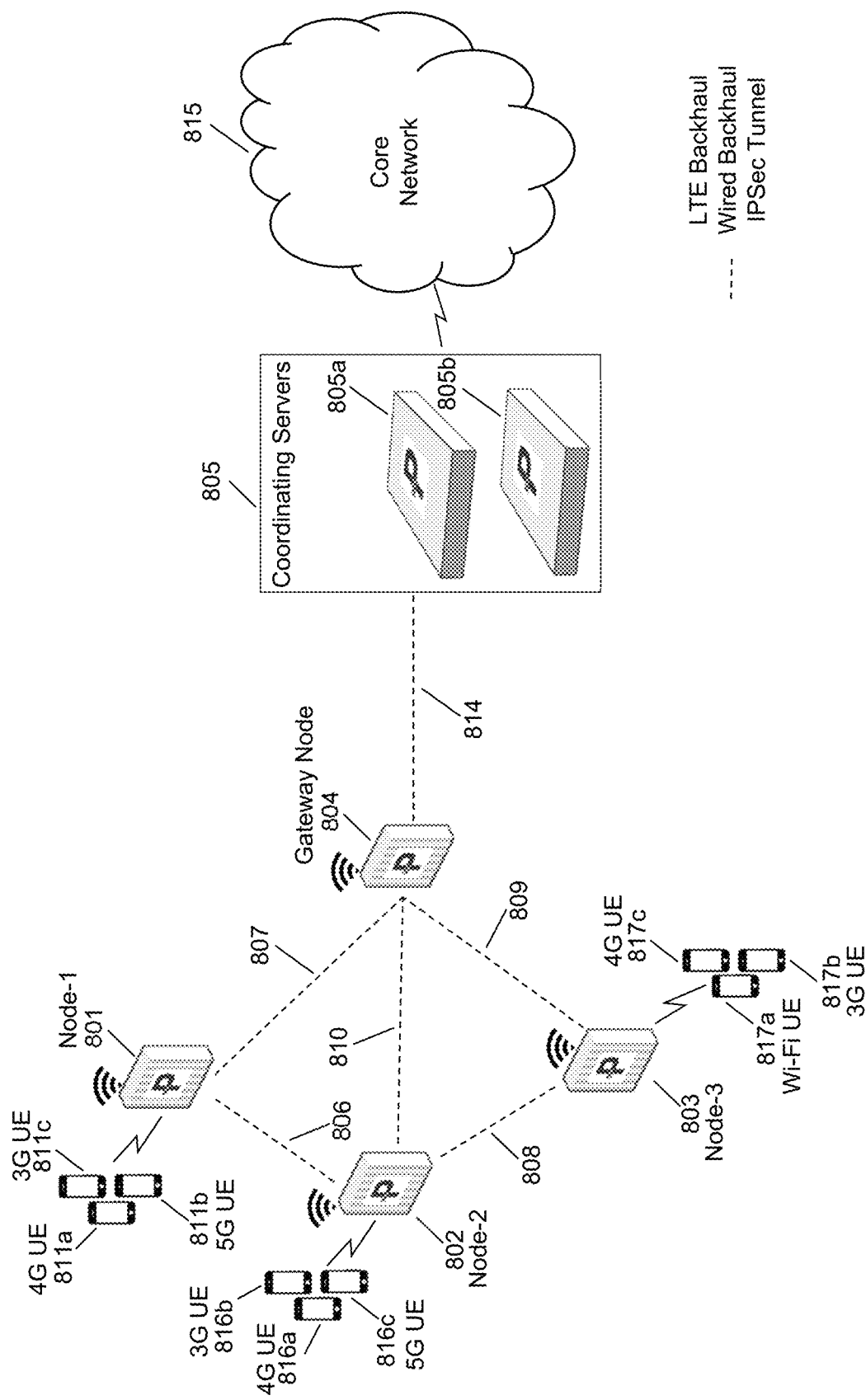
FIG. 8 a network diagram in accordance with some embodiments.

The present method and software enables SW and HW disaggregation. COTS, flexible placement and enablement of functions based on capacity, latency and functionality requirement. Independent scaling and Deployment flexibility. End to end network slicing enabled by SW architecture, built already for 5G slice creation Core Network—high throughput; CU co location; Slice specific Analytics, MEC enablement, edge data lake; and roaming, core convergence FIG. 8 is a network diagram in accordance with some embodiments. In some embodiments, as shown in FIG. 8, a mesh node 1 801, a mesh node 2 802, and a mesh node 3 803 are any G RAN nodes. Base stations 101, 802, and 803 form a mesh network establishing mesh network links 806, 807, 808, 809, and 810 with a base station 804. The mesh network links are flexible and are used by the mesh nodes to route traffic around congestion within the mesh network as needed. The base station 804 acts as gateway node or mesh gateway node, and provides backhaul connectivity to a core network to the base stations 801, 802, and 803 over backhaul link 814 to a coordinating server(s) 805 and towards core network 815. The Base stations 801, 802, 803, 804 may also provide eNodeB, NodeB, Wi-Fi Access Point, Femto Base Station etc. functionality, and may support radio access technologies such as 2G, 3G, 4G, 5G, Wi-Fi etc. The base stations 801, 802, 803 may also be known as mesh network nodes 801, 802, 803.

The coordinating servers 805 are shown as two coordinating servers 805a and 805b. The coordinating servers 805a and 805b may be in load-sharing mode or may be in active-standby mode for high availability. The coordinating servers 805 may be located between a radio access network (RAN) and the core network and may appear as core network to the base stations in a radio access network (RAN) and a single eNodeB to the core network, i.e., may provide virtualization of the base stations towards the core network. As shown in FIG. 8, various user equipments 811a, 811b, 811c are connected to the base station 801. The base station 801 provides backhaul connectivity to the user equipments 811a, 811b, and 811c connected to it over mesh network links 806, 807, 808, 809, 810 and 814. The user equipments may be mobile devices, mobile phones, personal digital assistant (PDA), tablet, laptop etc. The base station 802 provides backhaul connection to user equipments 812a, 812b, 812c and the base station 803 provides backhaul connection to user equipments 813a, 813b, and 813c. The user equipments 811a, 811b, 811c, 812a, 812b, 812c, 813a, 813b, 813c may support any radio access technology such as 2G, 3G, 4G, 5G, Wi-Fi, WiMAX, LTE, LTE-Advanced etc. supported by the mesh network base stations, and may interwork these technologies to IP.

In some embodiments, depending on the user activity occurring at the user equipments 811a, 811b, 811c, 812a, 812b, 812c, 813a, 813b, and 813c, the uplink 814 may get congested under certain circumstances. As described above, to continue the radio access network running and providing services to the user equipments, the solution requires prioritizing or classifying the traffic based at the base stations 801, 802, 803. The traffic from the base stations 801, 802, and 803 to the core network 815 through the coordinating server 805 flows through an IPSec tunnel terminated at the coordinating server 805. The mesh network nodes 801, 802, and 803 adds IP Option header field to the outermost IP Header (i.e., not to the pre-encapsulated packets). The traffic may from the base station 801 may follow any of the mesh network link path such as 807, 806-110, 806-108-109 to reach to the mesh gateway node 804, according to a mesh network routing protocol.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

Figure 9:
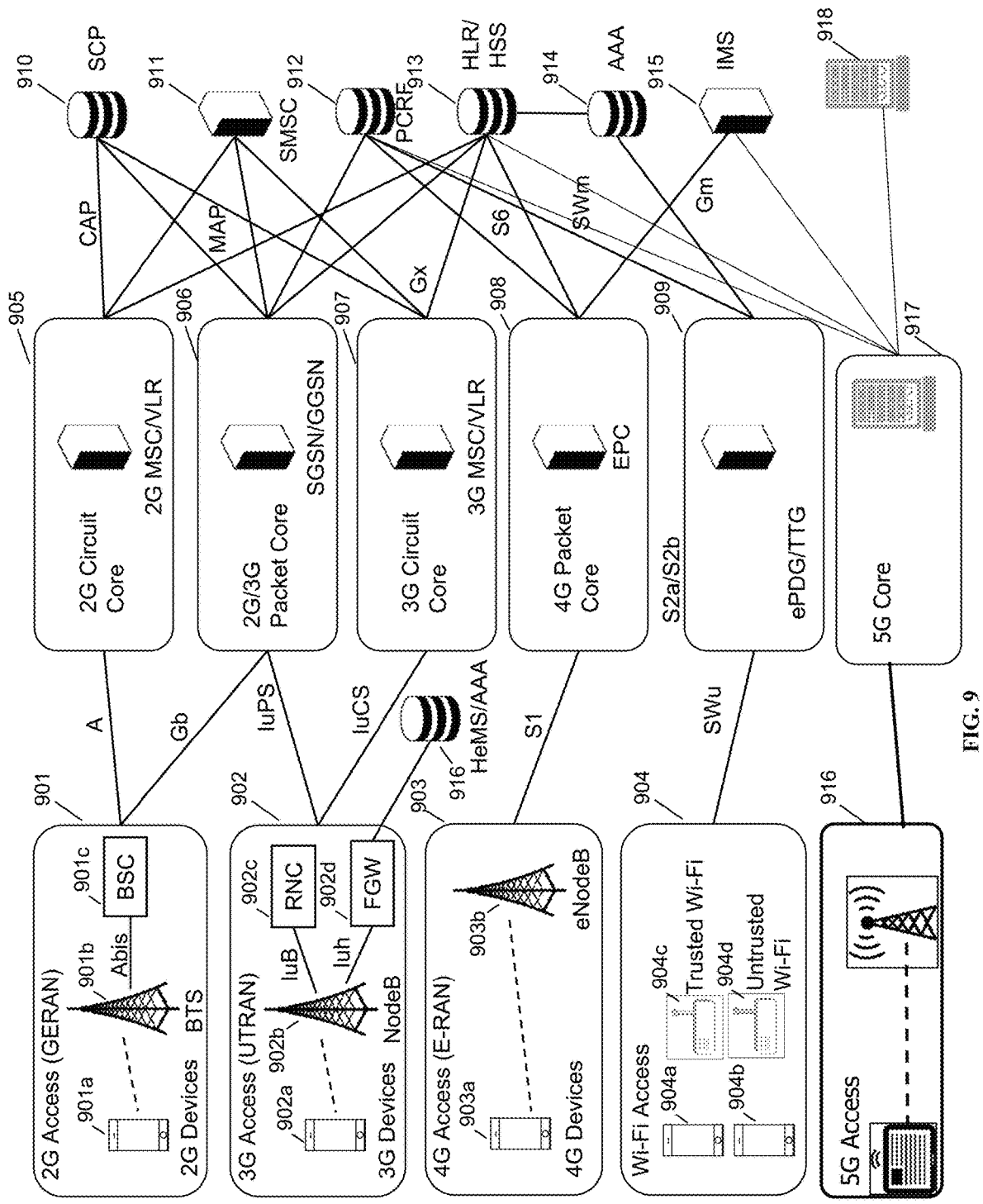
FIG. 9 is a schematic network architecture diagram for a mesh network.
Figure 10:
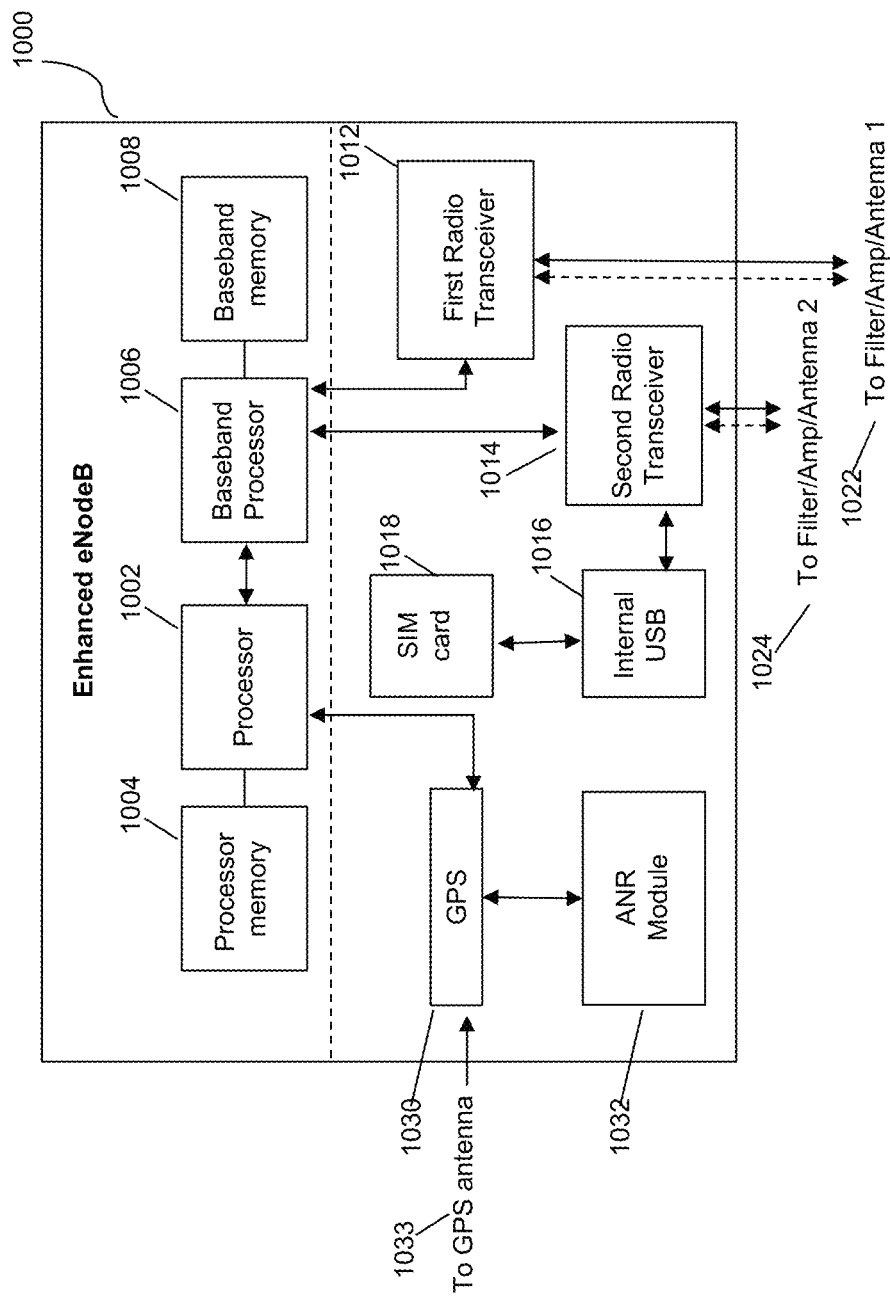
FIG. 10 is an enhanced eNodeB for performing the methods described herein, in accordance with some embodiments.

FIG. 9 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 901*a*, BTS 901*b*, and BSC 901*c*. 3G is represented by UTRAN 902, which includes a 3G UE 902*a*, nodeB 902*b*, RNC 902*c*, and femto gateway (FGW, which in 3GPP namespace is also known as a Home nodeB Gateway or HNBGW) 902*d*. 4G is represented by EUTRAN or E-RAN 903, which includes an LTE UE 903*a* and LTE eNodeB 903*b*. Wi-Fi is represented by Wi-Fi access network 904, which includes a trusted Wi-Fi access point 904*c* and an untrusted Wi-Fi access point 904*d*. The Wi-Fi devices 904*a* and 904*b* may access either AP 904*c* or 904*d*. In the current network architecture, each "G" has a core network. 2G circuit core network 909 includes a 2G MSC/VLR; 2G/3G packet core network 906 includes an SGSN/GGSN (for EDGE or UMTS packet traffic); 3G circuit core 907 includes a 3G MSC/VLR; 4G circuit core 908 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 930, the SMSC 931, PCRF 932, HLR/HSS 933, Authentication, Authorization, and Accounting server (AAA) 934, and IP Multimedia Subsystem (IMS) 939. An HeMS/AAA 936 is present in some cases for use by the 3G UTRAN. The diagram is used to indicate schematically the basic functions of each network as known to one of skill in the art, and is not intended to be exhaustive. For example, 5G core 917 is shown using a single interface to 5G access 916, although in some cases 5G access can be supported using dual connectivity or via a non-standalone deployment architecture.

Noteworthy is that the RANs 901, 902, 903, 904 and 936 rely on specialized core networks 909, 906, 907, 908, 909, 937 but share essential management databases 930, 931, 932, 933, 934, 939, 938. More specifically, for the 2G GERAN, a BSC 901*c* is required for Abis compatibility with BTS 901*b*, while for the 3G UTRAN, an RNC 902*c* is required for Iub compatibility and an FGW 902*d* is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

FIG. 6 is an enhanced eNodeB for performing the methods described herein, in accordance with some embodiments. Mesh network node 1000 may include processor 1002, processor memory 1004 in communication with the processor, baseband processor 1006, and baseband processor memory 1008 in communication with the baseband processor. Mesh network node 1000 may also include first radio transceiver 1012 and second radio transceiver 1014, internal universal serial bus (USB) port 1016, and subscriber information module card (SIM card) 1018 coupled to USB port 1016. In some embodiments, the second radio transceiver 1014 itself may be coupled to USB port 1016, and communications from the baseband processor may be passed through USB port 1016. The second radio transceiver may be used for wirelessly backhauling eNodeB 1000.

Processor 1002 and baseband processor 1006 are in communication with one another. Processor 1002 may perform routing functions, and may determine if/when a switch in network configuration is needed. Baseband processor 1006 may generate and receive radio signals for both radio transceivers 1012 and 1014, based on instructions from processor 1002. In some embodiments, processors 1002 and 1006 may be on the same physical logic board. In other embodiments, they may be on separate logic boards.

Processor 1002 may identify the appropriate network configuration, and may perform routing of packets from one network interface to another accordingly. Processor 1002 may use memory 1004, in particular to store a routing table to be used for routing packets. Baseband processor 1006 may perform operations to generate the radio frequency signals for transmission or retransmission by both transceivers 1010 and 1012. Baseband processor 1006 may also perform operations to decode signals received by transceivers 1012 and 1014. Baseband processor 1006 may use memory 1008 to perform these tasks.

The first radio transceiver 1012 may be a radio transceiver capable of providing LTE eNodeB functionality, and may be capable of higher power and multi-channel OFDMA. The second radio transceiver 1014 may be a radio transceiver capable of providing LTE UE functionality. Both transceivers 1012 and 1014 may be capable of receiving and transmitting on one or more LTE bands. In some embodiments, either or both of transceivers 1012 and 1014 may be capable of providing both LTE eNodeB and LTE UE functionality. Transceiver 1012 may be coupled to processor 1002 via a Peripheral Component Interconnect-Express (PCI-E) bus, and/or via a daughtercard. As transceiver 1014 is for providing LTE UE functionality, in effect emulating a user equipment, it may be connected via the same or different PCI-E bus, or by a USB bus, and may also be coupled to SIM card 1018. First transceiver 1012 may be coupled to first radio frequency (RF) chain (filter, amplifier, antenna) 1022, and second transceiver 1014 may be coupled to second RF chain (filter, amplifier, antenna) 1024.

SIM card 1018 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1000 is not an ordinary UE but instead is a special UE for providing backhaul to device 1000.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1012 and 1014, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 1002 for reconfiguration.

A GPS module 1030 may also be included, and may be in communication with a GPS antenna 1032 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 1032 may also be present and may run on processor 1002 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 11:
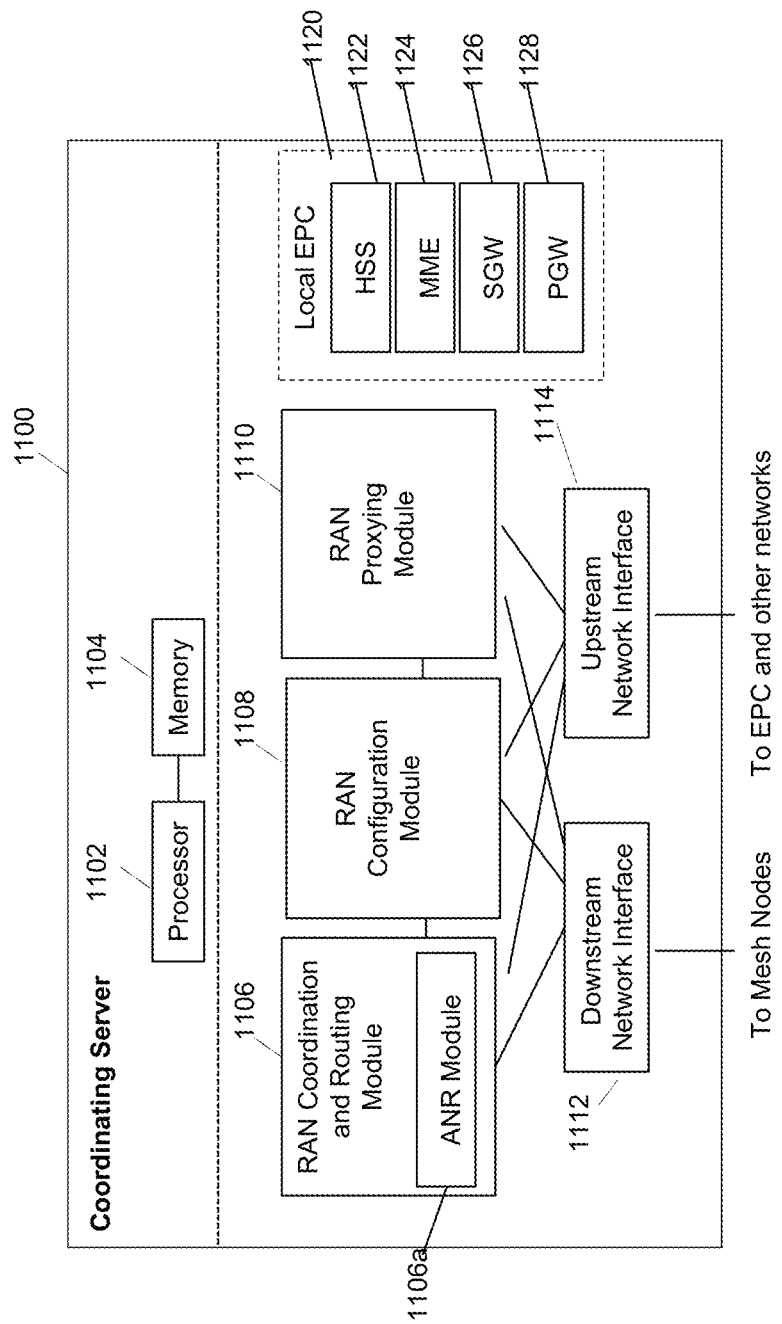
FIG. 11 is a coordinating server for providing services and performing methods as described herein, in accordance with some embodiments.

FIG. 11 is a coordinating server for providing services and performing methods as described herein, in accordance with some embodiments. Coordinating server 700 includes processor 1102 and memory 1104, which are configured to provide the functions described herein. Also present are radio access network coordination/routing (RAN Coordination and routing) module 1106, including ANR module 1106a, RAN configuration module 1108, and RAN proxying module 1110. The ANR module 1106a may perform the ANR tracking, PCI disambiguation, ECGI requesting, and GPS coalescing and tracking as described herein, in coordination with RAN coordination module 1106 (e.g., for requesting ECGIs, etc.). In some embodiments, coordinating server 1100 may coordinate multiple RANs using coordination module 1106. In some embodiments, coordination server may also provide proxying, routing virtualization and RAN virtualization, via modules 1110 and 1108. In some embodiments, a downstream network interface 1112 is provided for interfacing with the RANs, which may be a radio interface (e.g., LTE), and an upstream network interface 1114 is provided for interfacing with the core network, which may be either a radio interface (e.g., LTE) or a wired interface (e.g., Ethernet).

Coordinator 1100 includes local evolved packet core (EPC) module 1120, for authenticating users, storing and caching priority profile information, and performing other EPC-dependent functions when no backhaul link is available. Local EPC 1120 may include local HSS 1122, local MME 1124, local SGW 1126, and local PGW 1128, as well as other modules. Local EPC 1120 may incorporate these modules as software modules, processes, or containers. Local EPC 1120 may alternatively incorporate these modules as a small number of monolithic software processes. Modules 1106, 1108, 1110 and local EPC 1120 may each run on processor 1102 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method providing decomposition and distribution of network functions, comprising:
    decomposing a cellular core network function in a network into a decomposed core network function node including a plurality of virtual machines or containers, wherein decomposing is based on function; location; active connections or sessions at various layers in the network; usage; or ability to reconstitute; and
    moving the decomposed core network function node to any location across the network,
    wherein moving the decomposed core network function node to any location across the network includes moving the decomposed core network function node to at least one of a cell site, to an aggregation site, to an edge site, to a data center site, and to a back office site; and
    wherein a single network function is decomposed across multiple sites.

2. The method of claim 1 wherein the decomposed core network function node comprises a gateway node decomposed into a plurality of virtual machines or containers.

3. The method of claim 1 further comprising orchestrating the decomposed node using at least one of a virtual machine and a container orchestration scheme.

4. The method of claim 1 further comprising providing internal networking among the virtual machines.

5. The method of claim 1 further comprising providing network slicing, wherein each resource is able to be sliced and enabled to designate portions of resources as belonging to a network slice.

6. The method of claim 5 further comprising virtualizing an individual slice at any layer of the network.

7. The method of claim 5 further comprising creating a new container to provide a dedicated network function for a particular network slice at a particular deployment location.

8. The method of claim 5 wherein network slicing includes at least one of vertical network slicing and horizontal network slicing.

9. A non-transitory computer-readable medium containing instructions for providing decomposition and distribution of network functions which, when executed, cause a system to perform steps comprising:

decomposing a cellular core network function in a network into a decomposed core network function node including a plurality of virtual machines or containers, wherein decomposing is based on function; location; active connections or sessions at various layers in the network; usage; or ability to reconstitute; and moving the decomposed core network function node to any location across the network, wherein moving the decomposed core network function node to any location across the network includes moving the decomposed core network function node to at least one of a cell site, to an aggregation site, to an edge site, to a data center site, and to a back office site; and wherein a single network function is decomposed across multiple sites.

10. The computer-readable medium of claim 9 wherein the decomposed core network function node comprises a gateway node decomposed into a plurality of virtual machines or containers.

11. The computer-readable medium of claim 9 further comprising instructions for orchestrating the decomposed node using at least one of a virtual machine and a container orchestration scheme.

12. The computer-readable medium of claim 9 further comprising instructions providing internal networking among the virtual machines.

13. The computer-readable medium of claim 9 further comprising instructions providing network slicing, wherein each resource is able to be sliced and enabled to designate portions of resources as belonging to a network slice.

14. The computer-readable medium of claim 13 further comprising instructions virtualizing an individual slice at any layer of the network.

15. The computer-readable medium of claim 13 further comprising instructions creating a new container to provide a dedicated network function for a particular network slice at a particular deployment location.

16. The computer-readable medium of claim 13 further comprising instructions wherein network slicing includes at least one of vertical network slicing and horizontal network slicing.

\* \* \* \* \*